(12) United States Patent
Satake (10) Patent No.: US 8,201,404 B2
(45) Date of Patent: Jun. 19, 2012

(54) MOTOR CONTROL DEVICE FOR CONSTRUCTION MACHINERY

(75) Inventor: Hidetoshi Satake, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 782 days.

(21) Appl. No.: 12/307,307

(22) PCT Filed: Jul. 4, 2007

(86) PCT No.: PCT/JP2007/063383
§ 371 (c)(1),
(2), (4) Date: Jan. 2, 2009

(87) PCT Pub. No.: WO2008/004589
PCT Pub. Date: Jan. 10, 2008

(65) Prior Publication Data
US 2009/0308066 A1 Dec. 17, 2009

(30) Foreign Application Priority Data
Jul. 4, 2006 (JP) .................................. 2006-184517

(51) Int. Cl.
*E02F 9/22* (2006.01)
*F15B 21/04* (2006.01)

(52) U.S. Cl. .......................................... 60/493; 60/466

(58) Field of Classification Search .............. 60/433, 60/465, 466, 493
See application file for complete search history.

(56) References Cited

U.S. PATENT DOCUMENTS 5,058,383 A * 10/1991 Tsunemi et al. ................ 60/493
6,182,448 B1 * 2/2001 Ohkura et al. .................. 60/445
(Continued)

FOREIGN PATENT DOCUMENTS
EP          1 674 766 A1      6/2006
(Continued)

OTHER PUBLICATIONS

The Extended European Search Report dated Mar. 2, 2011 (Six (6) pages).

(Continued)

*Primary Examiner* — Thomas E Lazo
(74) *Attorney, Agent, or Firm* — Crowell & Moring LLP (57) ABSTRACT

A motor control device for construction machinery includes a hydraulic pump; a hydraulic motor driven by pressure oil from the hydraulic pump; a control valve that controls a flow of the pressure oil from the hydraulic pump to the hydraulic motor; a pair of main conduit lines that connect the hydraulic motor and the control valve on a delivery side and a return side thereof; an operation member that operates a spool of the control valve to either a neutral position that does not allow the pressure oil for driving from the hydraulic pump to pass through control valve to the hydraulic motor or a non-neutral position that allows the pressure oil for driving to pass through the control valve to the hydraulic motor; a braking pressure generating device that generates braking pressure in the main conduit lines on the return side in a state where the spool of the control valve is positioned in the neutral position as a result of being operated by the operation member, the braking pressure opposing rotation of the hydraulic motor; and a flow control device for allowing the pressure oil from the hydraulic pump to flow into the pair of main conduit lines while the braking pressure is generated by the braking pressure generating device.

15 Claims, 8 Drawing Sheets

U.S. PATENT DOCUMENTS 6,938,719 B2 * 9/2005 Ishimaru et al. ................ 60/443

FOREIGN PATENT DOCUMENTS

| | | |
|---|---|---|
| JP | 2-261901 A | 10/1990 |
| JP | 3-229003 A | 10/1991 |
| JP | 9-25661 A | 1/1997 |
| JP | 2000-310201 A | 11/2000 |
| JP | 2003-254305 A | 9/2003 |
| JP | 2004-204975 A | 7/2004 |

OTHER PUBLICATIONS

International Search Report dated Oct. 2, 2007 (two (2) pages).

* cited by examiner

MOTOR CONTROL DEVICE FOR CONSTRUCTION MACHINERY

TECHNICAL FIELD

The present invention relates to a motor control device for construction machinery such as a wheeled hydraulic shovel.

BACKGROUND ART

Devices are known in the art in which braking pressure is generated by a counterbalance valve of a return side pipe of a motor for traveling and oil within a circuit that is heated to a high temperature as a result of the occurrence of the braking pressure is discharged to a tank via an overload relief valve so as to suppress increases in oil temperature within the conduit line (see Patent Reference 1). With the device disclosed in Patent Reference 1, when an accelerator pedal is not being operated during traveling and a control valve returns to a neutral position, the circuit is replenished with oil from a tank via a check valve and the occurrence of cavitation is prevented.

Patent Reference 1: Japanese Patent Publication Laid-open No. 2003-254305

SUMMARY OF THE INVENTION

Problem(s) to be Solved by the Invention

For example, when the accelerator pedal is not being operated as in the case of traveling downhill, the extent of the increase in temperature of the oil within the circuit is substantial. It is therefore necessary to supply a comparatively large amount of oil to the circuit in order to suppress rises in temperature. However, if the oil was supplied from a tank via a check valve as with devices such as disclosed in Patent Reference 1, the amount of oil supply would be insufficient.

Means for Solving the Invention

The motor control device for construction machinery according to a first aspect of the present invention includes a hydraulic pump; a hydraulic motor driven by pressure oil from the hydraulic pump; a control valve that controls a flow of the pressure oil from the hydraulic pump to the hydraulic motor; a pair of main conduit lines that connect the hydraulic motor and the control valve on a delivery side and a return side thereof; an operation member that operates a spool of the control valve to either a neutral position that does not allow the pressure oil for driving from the hydraulic pump to pass through control valve to the hydraulic motor or a non-neutral position that allows the pressure oil for driving to pass through the control valve to the hydraulic motor; a braking pressure generating device that generates braking pressure in the main conduit lines on the return side in a state where the spool of the control valve is positioned in the neutral position as a result of being operated by the operation member, the braking pressure opposing rotation of the hydraulic motor; and a flow control device for allowing the pressure oil from the hydraulic pump to flow into the pair of main conduit lines while the braking pressure is generated by the braking pressure generating device.

In a second aspect of the present invention, it is preferred that the flow control device in the motor control device for construction machinery according to the first aspect includes a control valve actuating device that actuates the spool of the control valve by a specified amount from the neutral position toward the non-neutral position regardless of operation of the operation member, and allows the pressure oil to flow from the hydraulic pump through the control valve to the pair of main conduit lines through the control valve actuating device.

In a third aspect, it is preferred that the control valve actuating device in the motor control device for construction machinery according to the second aspect has a limiting mechanism that limits an amount of actuation of the spool of the control valve from the neutral position of the control valve toward the non-neutral position of the control valve.

In a fourth aspect, it is preferred that the detection device in the motor control device for construction machinery according to the any one of the first to the third aspects detects a state where downhill travel is performed by the construction machinery under a condition that braking pressure is generated by the braking pressure generating device, the state is hereinafter referred to as "neutral downhill travel", and the flow control device allows the pressure oil from the hydraulic pump to flow to the pair of main conduit lines when neutral downhill travel is detected by the detection device.

In a fifth aspect, the detection device in the motor control device for construction machinery according to the fourth aspect may include a driving pressure detection device that detects driving pressure that drives the hydraulic motor; an operation detection device that detects an operation performed with the operation member; and a speed detection device that detects a traveling speed of the construction machinery. In this case, it maybe determined that the neutral downhill travel is performed by the construction machinery when the driving pressure detected by the driving pressure detection device is equal to or less than a specified value, an operation with the operation member so as to put the control valve to the neutral position is detected by the operation detection device, and the traveling speed of the construction machinery detected by the speed detection device is equal to or less than a specified value.

In a sixth aspect, it is preferred that in the motor control device for construction machinery according to the second aspect, the spool of the control valve is actuated by a specified amount from the neutral position towards the non-neutral position, the pressure oil delivered from the hydraulic pump to the hydraulic motor for driving thereof is limited to a quantity such that an increase in rotation speed of the hydraulic motor is prevented.

In a seventh aspect, it is preferred that in the control valve actuating device in the motor control device for construction machinery according to the second or the sixth aspect is a ram cylinder that extends and retracts according to the operation of a solenoid-operated directional valve, and a maximum amount of extension of the ram cylinder corresponds to the prescribed amount for the control valve.

In an eighth aspect, it is preferred that the flow control device in the control device for construction machinery according to the first aspect has a directional valve, and the pressure oil from the hydraulic pump is guided to the pair of main conduit lines via the directional valve without passing via the control valve.

In a ninth aspect, the hydraulic motor in the control device for construction machinery according to any one of the first to the eighth aspect is a hydraulic motor for traveling use.

The construction machinery according to a tenth aspect of the present invention includes the motor control device for construction machinery according to any one of the first to the ninth aspect.

In an eleventh aspect, it is preferred that the construction machinery according to the tenth aspect construction machinery that travels on wheels.

Advantageous Effect of the Invention

According to the present invention, pressure oil from a hydraulic pump is guided to a main pipe of a hydraulic motor. It is therefore possible to suppress rises in temperature of the oil within the motor circuit when braking pressure occurs.

BEST MODE FOR CARRYING OUT THE INVENTION

-First Embodiment-

The following is an explanation of a motor control device for construction machinery according to a first embodiment of the present invention referring to FIGS. 1 to 6.

Figure 1:
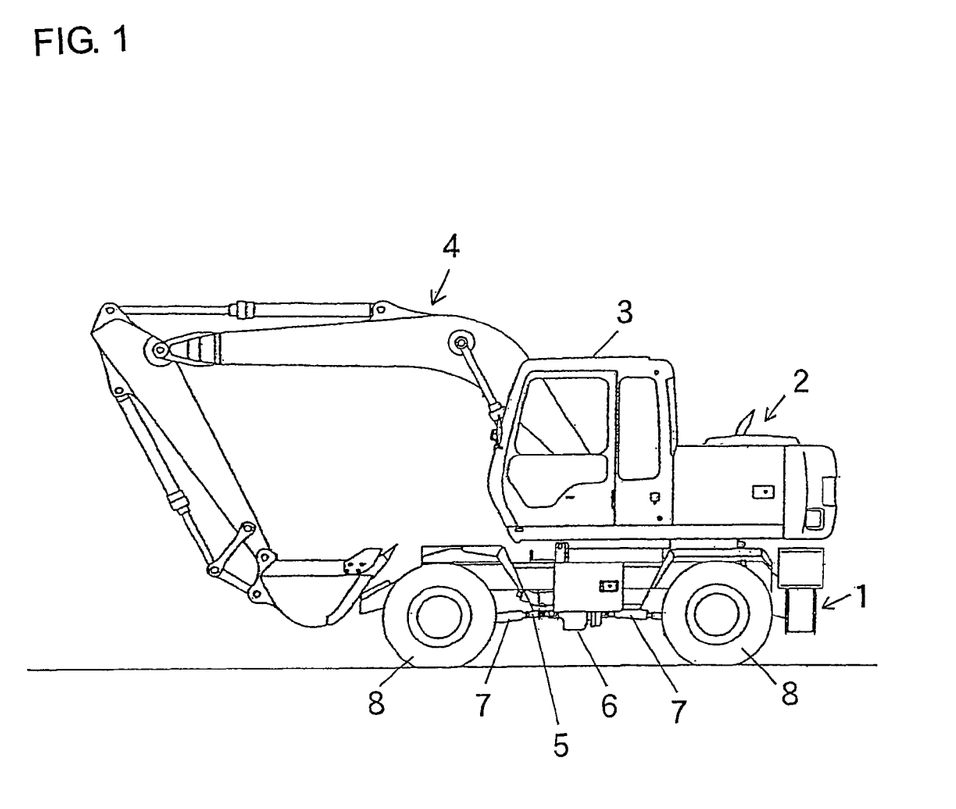
FIG. 1 is a side view of a wheeled hydraulic shovel to which the present invention is applied.

FIG. 1 shows a wheeled hydraulic shovel to which the present invention is applied. The wheeled hydraulic shovel includes a lower travel machinery 1 and an upper swing machinery 2 mounted in a swingable manner on an upper part of the lower travel machinery 1. An operator cab 3 and a front attachment 4 for working are provided at the upper swing machinery 2. A travel hydraulic motor 5, a transmission 6, a propeller shaft 7, and tires 8 are provided at the lower travel machinery 1.

Figure 2:
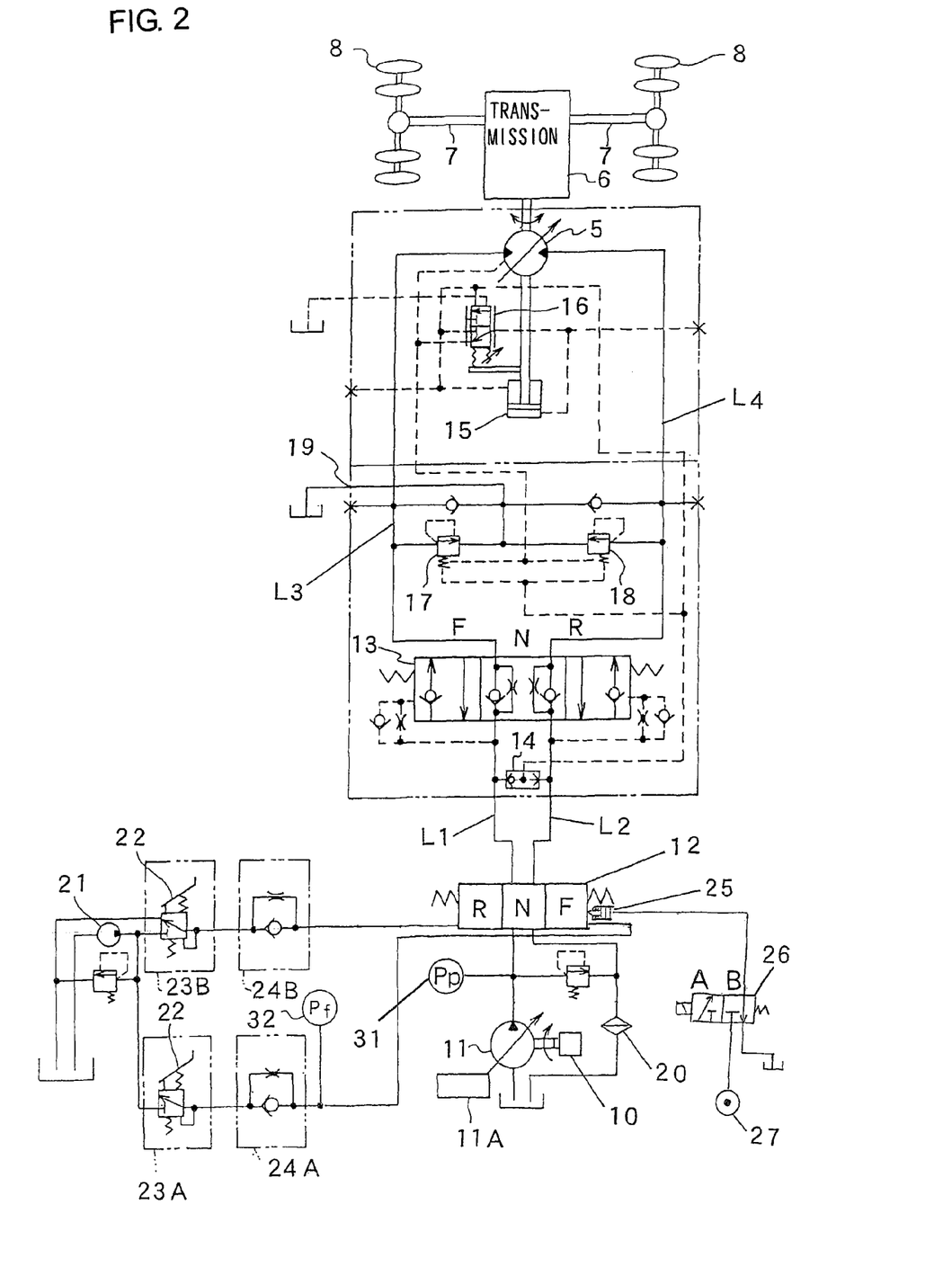
FIG. 2 is a diagram of a hydraulic circuit for a motor control device according to a first embodiment of the present invention.

FIG. 2 is a diagram for a hydraulic circuit for traveling use showing a configuration of the motor control device according to the first embodiment. The direction and flow rate of pressure oil from a hydraulic pump 11 driven by an engine 10 is controlled by a control valve 12 as shown in FIG. 2. The control valve 12 and the travel hydraulic motor 5 are connected by a pair of main pipes L1 to L4. The pressure oil having passed through the control valve 12 is then supplied to the travel hydraulic motor 5 via a counterbalance valve 13. Rotation of the travel hydraulic motor 5 is transmitted to the tires 8 via the propeller shaft 7 after being reduced by the transmission 6, and the vehicle (hydraulic shovel) travels. The reduction ratio of the transmission 6 can be switched over between two stages of, for example, low (large reduction ratio) and high (small reduction ratio). Although not shown in the drawings, the pressure oil from the hydraulic pump 11 is supplied not only to the travel hydraulic motor 5, but also to other hydraulic actuators such as, for example, a hydraulic actuator for driving a front attachment for working use.

The hydraulic pump 11 is a variable displacement pump, where an amount of tilt (displacement capacity) is controlled by a pump regulator 11A. The pump regulator 11A includes a torque limiter. Discharge pressure of the pump is fed back to the torque limiter. The horsepower of the pump is then controlled thereby so that a load determined by the pump discharge pressure and the pump displacement capacity does not exceed the engine output. A maximum tilt limiter is provided at the pump regulator 11A and a maximum flow rate for the hydraulic pump 11 is determined by the maximum tilt limiter.

The travel hydraulic motor 5 is a variable displacement motor equipped with a self-pressure regulating tilt control mechanism where the driving pressure for driving the motor acts through a shuttle valve 14 on a control piston 15 of the travel hydraulic motor 5 and a servo piston 16. The motor capacity is therefore small in regions where the driving pressure for driving the motor is small and is large in regions where the driving pressure for driving the motor is large. The driving pressure for driving the motor has a correlative relationship with the discharge pressure of the hydraulic pump 11. Pump discharge pressure Pp is detected by a pressure sensor 31.

The counterbalance valve 13 is switched over according to the driving pressure for driving the travel hydraulic motor 5. This is to say that when pressure within the pipe L1 or L2 on a delivery side delivering pressure oil to the travel hydraulic motor 5 becomes large, the counterbalance valve 13 is switched over from a neutral position (N position) to an F position or an R position, respectively, and is switched over to the neutral position when the pressure within the pipe L1 or L2 on the delivery side becomes small. While the counterbalance valve 13 is switched over to the neutral position, return oil that returns from the travel hydraulic motor 5 is limited by the diaphragm of the counterbalance valve 13 and braking pressure opposing rotation of the travel hydraulic motor 5 is generated at the pipe L4 or L3 on a return side of the travel hydraulic motor 5. The maximum braking pressure is limited by relief valves 17 and 18, with the return oil that has passed through the relief valves 17 and 18 being guided to an inlet side of the travel hydraulic motor 5.

Figure 3:
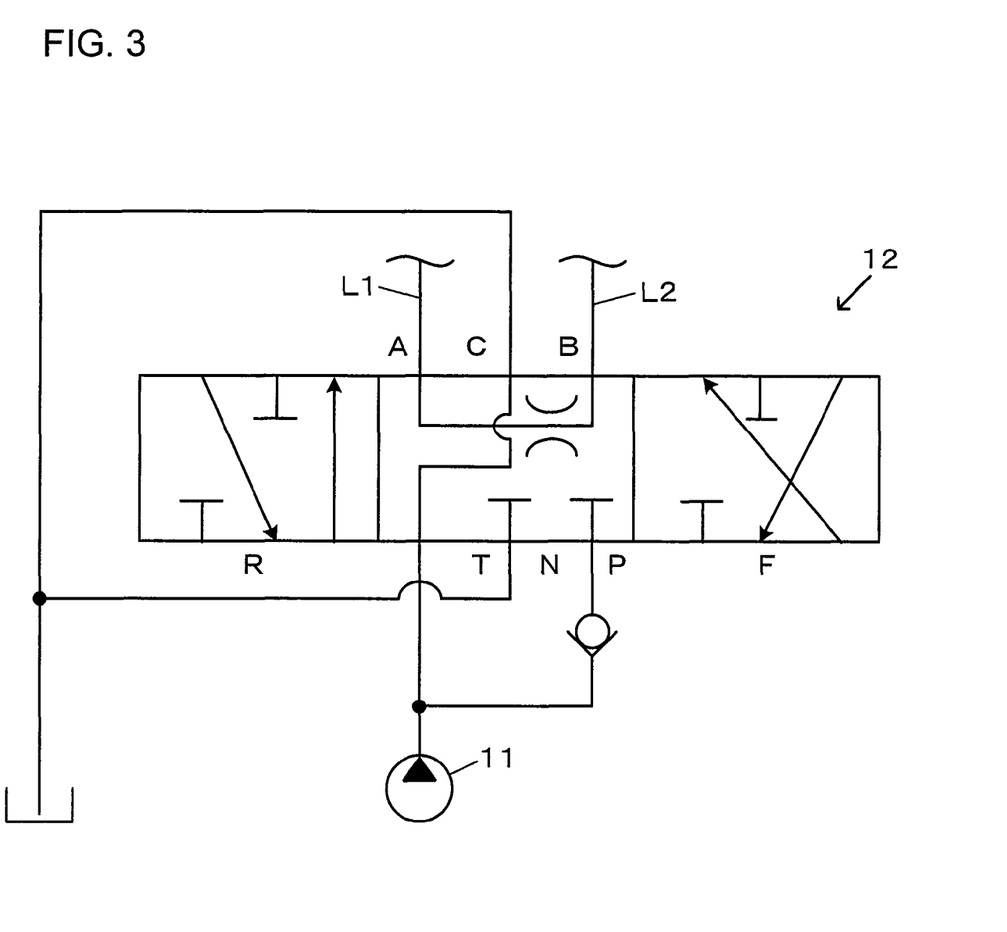
FIG. 3 is a diagram showing the details of a control valve of FIG. 2.
Figure 4:
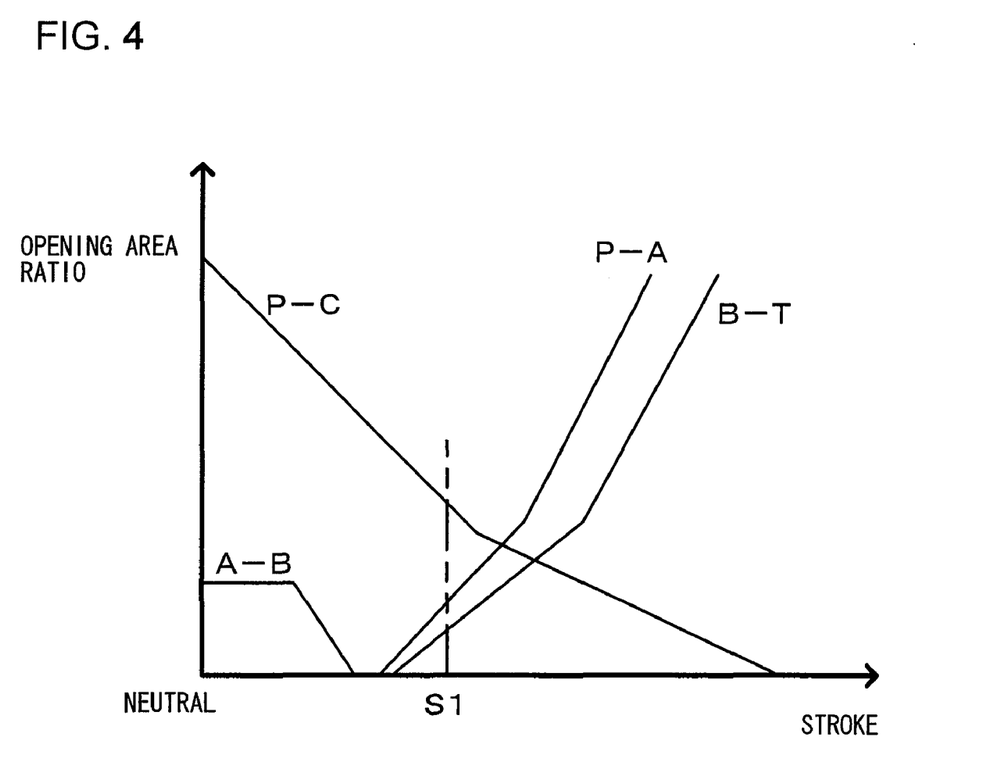
FIG. 4 is a diagram showing the characteristics of open area ratio of the control valve of FIG. 2.

As shown in FIG. 3, the control valve 12 is a 3-position-6-port directional valve, with pressure oil from the hydraulic pump 11 being guided to a port P via a check valve. At the control valve 12, in a neutral position N, the ports P-C communicate, and the ports A-B communicate via a diaphragm. Further, in a position F, the ports A-P and the ports B-T communicate, and in an R position, the ports A-T and the ports B-P communicate. An opening characteristic for the control valve 12 when the control valve 12 is switched over from the neutral position to the F-position, i.e. a relationship between a stroke of the spool and an opening area ratio between the respective ports is as shown in FIG. 4.

As shown in FIG. 2, the control valve 12 controls the switching direction and stroke depending on the travel pilot pressure from the pilot circuit. The pilot circuit includes a pilot pump 21, a pair of pilot valves 23A and 23B for travel use that generate pilot pressure according to an operation of an accelerator pedal 22, and a pair of slow return valves 24A and 24B interposed between each of the pilot valves 23A and 23B and a pilot port of the control valve 12.

The accelerator pedal 22 is pivotable in forward and reverse directions as the result of a forward operation (forward depression) or a rearward operation (rearward release). When the accelerator pedal 22 is pressed forwards, the pilot valve 23A is driven, and when the accelerator pedal 22 is released rearwards, the pilot valve 23B is driven. Pilot pressure is generated according to the extent of operation of the accelerator pedal 22 due to driving of the pilot valves 23A and 23B. A travel pilot pressure Pf due to driving of the pilot valve 23A is detected by a pressure sensor 32. When the accelerator pedal 22 is in a neutral position, the pilot pressure Pf is of a prescribed value Pf0 or less.

A ram cylinder 25 is provided at the control valve 12 and extends and retracts as a result of changing over of a solenoid-operated directional valve 26. This is to say that when the solenoid-operated directional valve 26 is switched over to a position A, pilot pressure from a hydraulic power source 27 acts on the ram cylinder 25 and the ram cylinder 25 extends. As a result, thrust from the ram cylinder 25 acts on a spool of the control valve 12, the spool strokes by a prescribed extent (S1 of FIG. 4) and the control valve 12 is switched over to the F-position side by a prescribed amount. In this state, i.e. when the control valve 12 is switched over to the F-position side by just a prescribed amount, the ports P-C, the ports P-A, and the ports B-T of the control valve 12 communicate as shown in FIG. 4, but the opening area ratio of the ports P-C is larger than the opening area ratios of the ports P-A and the ports B-T. Namely, the opening area ratios of the ports P-A and of the ports B-T of the control valve 12 are smaller than the opening area ratio of the ports P-C, and the opening area ratio of the ports P-C is set to a value that ensures that the vehicle does not accelerate. A maximum extended amount for the ram cylinder 25 is set such that the spool of the control valve 12 strokes by a prescribed amount S1 when the ram cylinder 25 extends by the maximum extended amount.

On the other hand, when the solenoid-operated directional valve 26 is switched over to the position B, the ram cylinder 25 communicates with the tank. As a result, the action of pressing force on the control valve 12 due to the ram cylinder 25 stops, the ram cylinder 25 is retracted as the result of spring force, and the control valve 12 is returned to the neutral position. When the solenoid-operated directional valve 26 is switched over to the position B, the hydraulic circuit of FIG. 2 is operated, for example, as follows.

When the accelerator pedal 22 is operated, pilot pressure oil output by the pilot valve 23A acts on the pilot port of the control valve 12. The control valve 12 is then switched over to the side of position F by the stroke according to the pilot pressure. Pressure oil is therefore supplied from the hydraulic pump 11 to the travel hydraulic motor 5. Then, the pipe L1 between the control valve 12 and the counterbalance valve 13 reaches a driving pressure for driving the motor corresponding to the load. The counterbalance valve 13 is then switched over to the F-position side by this driving pressure for driving the motor. The pipe L4 on the return oil side is disconnected as a result of this switching and the pressure oil from the travel hydraulic motor 5 is returned to the tank via the counterbalance valve 13, the pipe L2, the control valve 12, and an oil cooler 20. The travel hydraulic motor 5 is therefore driven and the vehicle travels forwards.

At the time of traveling downhill, the vehicle body accelerates as a result of the force of inertia due to gravity, the hydraulic motor 5 exhibits a pump action and the driving pressure for driving the motor is reduced. The counterbalance valve 13 is switched over to the neutral position in accompaniment with this, braking pressure occurs at the return side pipe L4 and a braking force acts on the vehicle. When operation of the accelerator pedal 22 is stopped at this time, the return oil at the pilot pressure is constricted by a diaphragm of a slow return valve 24 and the control valve 12 is gradually switched over to the neutral position.

When the control valve 12 is completely switched over to the neutral position, the ports A-B of the control valve 12 are put in a communicating state via the diaphragm (refer to FIG. 4). In this state, the flow of oil to the tank from the pipe L4 is prevented and the braking pressure increases. When the braking pressure exceeds the pressure set for the overload relief valve 18, some of the return oil is guided to the travel hydraulic motor 5 via the overload relief valve 18. At this time, when the amount of oil, which is necessary for the rotation of the travel hydraulic motor 5, is insufficient, the oil is replenished from the tank to the travel hydraulic motor 5 using a makeup port 19.

The case of traveling downhill at a vehicle speed of a prescribed a value V0 or more with the control valve 12 switched to a neutral position as the result of non-operation of the accelerator pedal 22 is referred to as "neutral downhill travel". During neutral downhill travel, travel pilot pressure Pf is of a prescribed value Pf0 or less ($Pf \leq Pf0$), the pump discharge pressure Pp is of a prescribed value or less ($Pp \leq Pp0$), and vehicle speed V is of a prescribed value V0 or more ($V \geq V0$)

When neutral downhill travel takes place, the pressure oil that has generated the braking pressure at the return side pipe L4 is guided to the delivery side pipe L3 without being returned to the tank. The temperature of the oil within the motor circuit therefore gradually rises and this may cause damage such as damage to seal members of the hydraulic equipment. In this event, for example, the oil in the return side pipe L4 is discharged to the tank via the overload relief valve 18. When this portion of oil is then taken into within the motor circuit via the makeup port 19, a fall in temperature within the circuit is achieved. However, the amount of pressure oil replenished from the makeup port 19 depends on the intake action. When the amount of replenished hydraulic oil cannot be ensured because of influences such as pipe resistance, it is not possible to make the temperature fall sufficiently and it is feared that this will cause the lifespan of the hydraulic motor to become shorter. In this embodiment, the ram cylinder 25 is controlled when neutral downhill travel is taking place as described in the following and rises in the temperature of oil within the motor circuit are suppressed.

Figure 5:
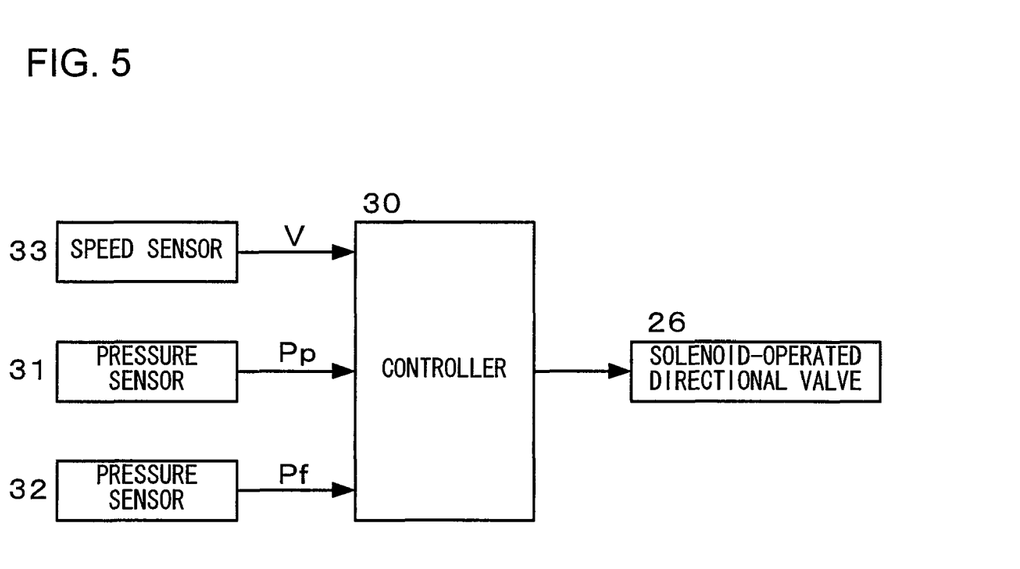
FIG. 5 is a block diagram of the motor control device according to the first embodiment.

FIG. 5 is a block diagram showing a structure for a motor control device of the first embodiment. A speed sensor 33 that detects the speed V of the wheel type hydraulic shovel, the pressure sensor 31 that detects the pump discharge pressure Pp, and the pressure sensor 32 that detects the travel pilot pressure Pf are connected to a controller 30. Processing described in the following is then executed at the controller 30 and a control signal is output to the solenoid-operated directional valve 26.

Figure 6:
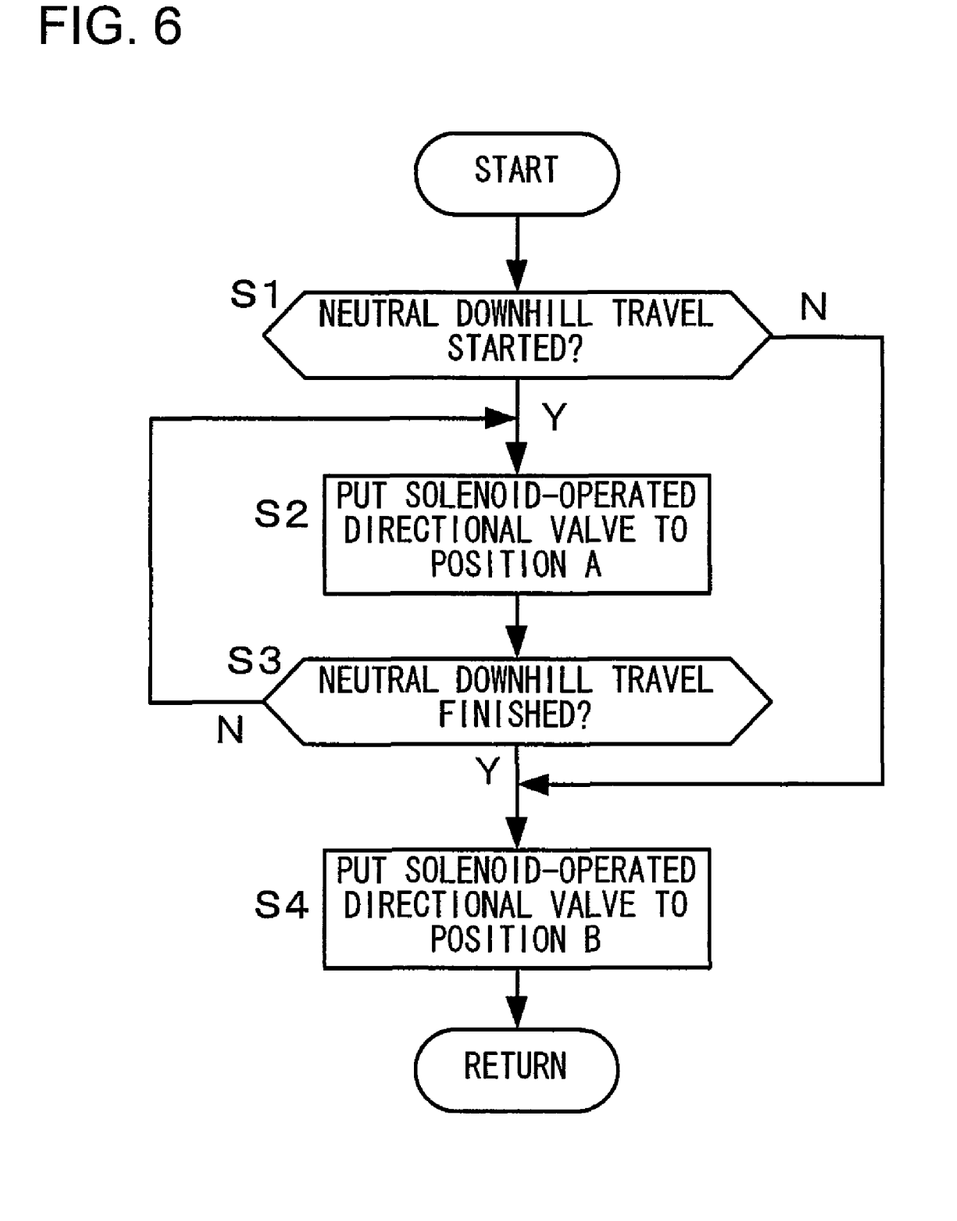
FIG. 6 is a flowchart showing an example of processing occurring at the controller of FIG. 5.

FIG. 6 is a flowchart showing an example of processing executed by the controller 30 in the first embodiment. The processing in this flowchart starts, for example, by turning the engine switch (not shown) ON. In step S1, a determination is made as to whether neutral downhill travel has started based on signals from the sensors 31 to 33. When all of the conditions $V \geq V0$, $Pf \leq Pf0$, $Pp \leq Pp0$ are satisfied, an affirmative determination is made in step S1, whereas a negative determination is made in step S1 when any one of the conditions is not satisfied.

When the determination in step S1 is affirmative, the operation proceeds to step S2, whereas when the determination in step S1 is negative, the operation proceeds to step S4. In step S2, the solenoid-operated directional valve 26 is switched over to position A. Pilot pressure therefore acts on the ram cylinder 25 and the ram cylinder 25 extends. In step S3, a determination is made as to whether neutral downhill travel has been finished based on signals from the sensors 31 to 33. Determination in step S3 is affirmative when any of $V<V0$, $Pf>Pf0$, or $Pp>Pp0$ are satisfied, but is negative when all of the conditions are not satisfied. When the determination in step S3 is affirmative, the operation proceeds to step S4. When the determination in step S3 is negative, the operation returns to step S2. In step S4, the solenoid-operated directional valve 26 is switched over to position B. The action of the pilot pressure on the ram cylinder 25 therefore stops.

An explanation is now given of the characteristic operation of the motor control device according to the first embodiment.

The start of neutral downhill travel is detected when the vehicle speed V is of a prescribed value V0 or more at the time of traveling downhill in a state where the accelerator pedal 22 is operated to be kept in the neutral position. The ram cylinder 25 therefore extends (step S2), the spool of the control valve 12 strokes by a prescribed amount S1, the communication of the ports A-B of the control valve 12 is blocked, and the ports P-A and the ports B-T communicate, respectively. When the control valve 12 is switched over from the neutral position to the side of the position F by just a prescribed amount as a result of the stroke of the spool, the pressure oil from the hydraulic pump 11 is guided into the pipe L1 via the control valve 12. Some of the oil returning from the travel hydraulic motor 5 passes via the control valve 12 and is passed through the oil cooler 20 so as to be returned to the tank. As a result, the oil at a high temperature within the pipes L1 to L4 is substituted with oil at a low temperature within the tank and the interior of the motor circuit can be cooled.

In this event, discharged oil is supplied to the motor circuit from the hydraulic pump 11. It is therefore possible to supply a sufficient amount of pressure oil necessary for cooling and damage to seal members due to increases in oil temperature can be prevented even when neutral downhill travel takes place for a long period of time. In a state where the spool of the control valve 12 strokes by a prescribed amount S1, the opening area ratios of the ports P-A and of the ports B-T of the control valve 12 is smaller than the opening area ratio of the ports P-C. Moreover, the opening area ratio of the ports P-C is sufficiently larger than the opening area ratio for generating the pump pressure required for the vehicle to travel. It is therefore possible to make the amount of pressure oil supplied from the hydraulic pump 11 to the travel hydraulic motor 5 small, and to suppress increases in the rotational speed of the travel hydraulic motor 5.

When the speed V is less than a prescribed value V0, the force of inertia of the vehicle body decreases and the braking pressure within the pipe L4 also decreases. Completion of neutral downhill travel is therefore detected at this time. The action of the pressing force from the ram cylinder 25 is then stopped, and the control valve 12 is returned to the neutral position (step S4). The flow of oil from the hydraulic pump 11 to the pipe L1 and the flow of oil from the pipe L2 to the tank are therefore blocked and the oil therefore circulates between the pipes L1 and L2. On this occasion, the braking pressure within the pipe L4 is low so that rises in the oil temperature are not problematic. Since the ram cylinder 25 does not extend except when traveling downhill, the operation of the control valve 12 is not impeded when traveling on level ground or when traveling uphill.

The first embodiment therefore brings about the following operational effects.

(1) The control valve 12 is switched over from the neutral position to the side of position F by just a prescribed amount by the ram cylinder 25 when neutral downhill travel is taking place. Pressure oil is therefore guided to the pipe L1 from the hydraulic pump 11, braking pressure is generated in the pipe L4, and rises in oil temperature of the motor circuit can be prevented.

(2) The supply of pressure oil to the ram cylinder 25 is stopped at times except for the neutral downhill travel. An operation of stopping the vehicle is therefore straightforward and does not involve the control valve 12 being forcibly switched over to the side of the F-position at the time of traveling downhill at low speeds where the speed is of a prescribed value V0 or less.

(3) The pressure oil from the hydraulic pump 11 is guided to the travel hydraulic motor 5 via the control valve 12. A supply of cooling oil can therefore be diverted to existing hydraulic power sources and control valves, thereby achieving efficiency.

(4) Neutral downhill travel is determined based on the pump discharge pressure Pp, the travel pilot pressure Pf, and the vehicle speed V. The determination of neutral downhill travel is therefore straightforward.

(5) The control valve 12 is switched over as a result of driving of the ram cylinder 25. It is therefore possible to mechanically limit the extent of switching of the control valve 12 and the control valve 12 can therefore be switched over precisely by a prescribed amount.

(6) The structure is therefore straightforward because the control valve 12 is only switched over to the side of the position F by the ram cylinder 25.

-Second Embodiment-

Figure 7:
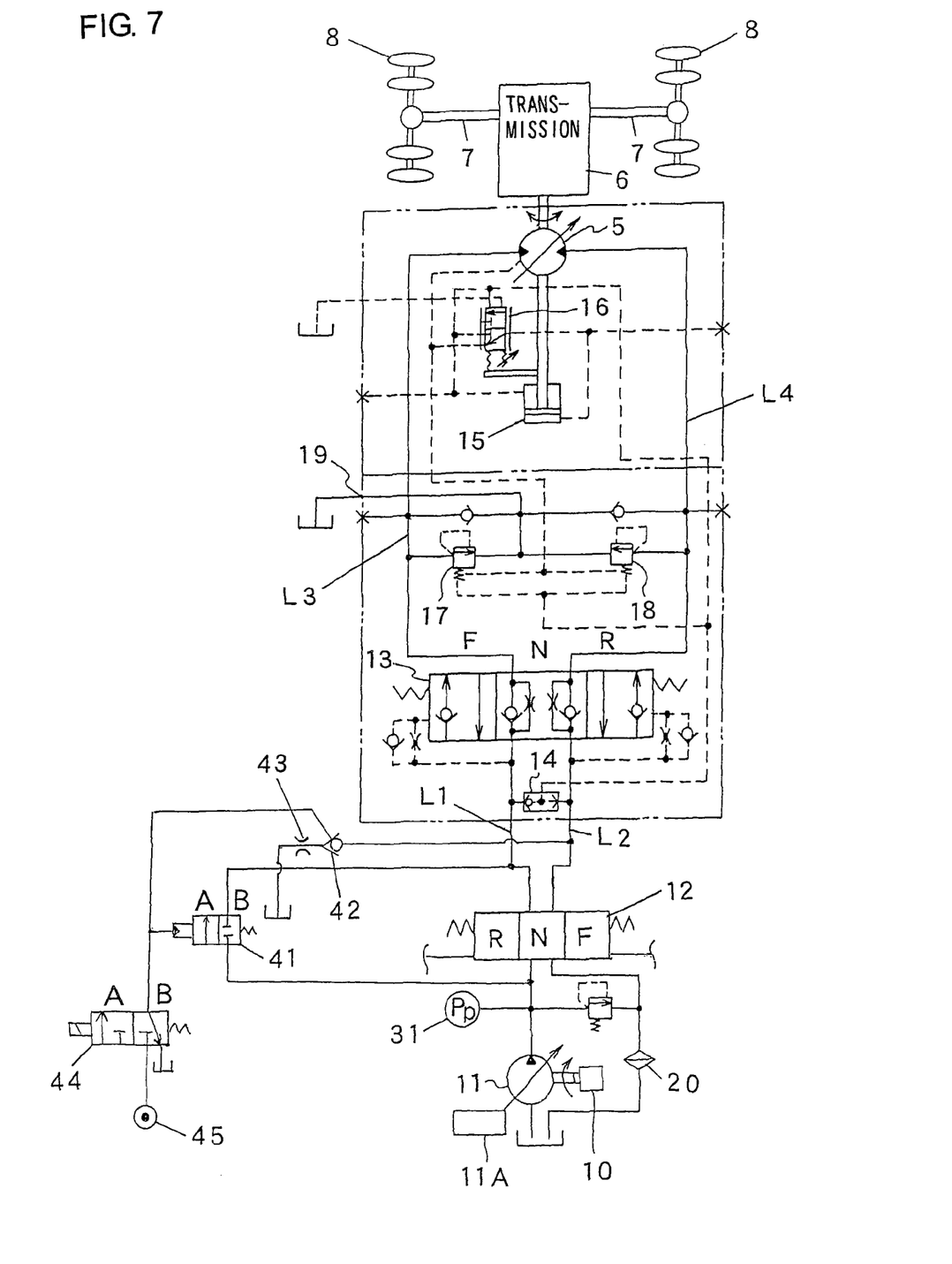
FIG. 7 is a diagram of a hydraulic circuit for a motor control device according to a second embodiment of the present invention.

A description is given of a second embodiment of a motor control device for construction machinery of the present invention with reference to FIG. 7.

In the first embodiment, the pressure oil is supplied to within the drive circuit of the travel hydraulic motor 5 via the control valve 12 when neutral downhill travel is taking place. However, in the second embodiment, the pressure oil is supplied without going via the control valve 12. Parts that are the same as those shown in FIGS. 1 to 6 are given the same numerals and an explanation is given in the following only of points of distinction with the first embodiment.

FIG. 7 is a diagram of a hydraulic circuit showing a configuration of the motor control device according to the second embodiment. The pilot pump 21, the pilot valves 23A and 23B, the slow return valves 24A and 24B, and the pressure sensor 32 are omitted from FIG. 7. As shown in FIG. 7, the pipe L1 is connected to the hydraulic pump 11 via a hydraulic directional valve 41 and the pipe L2 is connected to the tank via a pilot check valve 42 and a diaphragm 43. Each of the pilot ports of the hydraulic directional valve 41 and the pilot check valve 42 are connected to a solenoid-operated directional valve 44, respectively.

The solenoid-operated directional valve 44 is switched over using the same processing as that illustrated in FIG. 6. Namely, the solenoid-operated directional valve 44 is switched over to the position B until the neutral downhill travel is started and is switched over to the position A when the start of neutral downhill travel is detected. When the end of neutral downhill travel is then detected thereafter, the solenoid-operated directional valve 44 is again switched over to the position B.

When the vehicle speed is of the prescribed value of V0 or more during downhill travel and the solenoid-operated directional valve 44 is switched over to the position A, pilot pressure from a hydraulic power source 45 acts on the hydraulic directional valve 41 and the pilot check valve 42, respectively. The hydraulic directional valve 41 is then switched over to the position A by the pilot pressure, the control valve 12 is bypassed, and the pressure oil is guided to the pipe L1 from the hydraulic pump 11. The pilot check valve 42 then functions as a relief valve enabling the oil to flow from the pipe L2 to the tank. As a result, low-temperature pressure oil is supplied from the hydraulic pump 11 to the motor circuit when neutral downhill travel is taking place. It is therefore possible to cool the motor circuit. The extent of the opening of the hydraulic directional valve 41 in this case is equal to the opening area ratio (FIG. 4) of the ports P-A when the spool of the control valve 12 strokes by just S1. The surface area of the diaphragm 43 is therefore equal to the opening area ratio of the ports B-T.

When the vehicle speed is less than the threshold value V0, and the solenoid-operated directional valve 44 is switched over to the position B, the pilot pressure is stopped from acting on the hydraulic directional valve 41 and the pilot check valve 42. As a result, the hydraulic directional valve 41 is switched over to the position B and the flow of pressure oil from the hydraulic pump 11 to the pipe L1 is blocked. The pilot check valve 42 functions as a check valve to block pressure oil from returning from the pipe L2 to the tank. It is therefore possible for braking pressure to be generated effectively at the return side pipe L4 and stopping of the vehicle is straightforward.

In the second embodiment, the pressure oil is guided to the pipe L1 from the hydraulic pump 11 via the hydraulic directional valve 41 at the time of neutral downhill travel and the pressure oil from the pipe L2 is returned to the tank via the pilot check valve 42. It is therefore possible to sufficiently cool the oil within the motor circuit. In this event, the control valve 12 is bypassed and the pressure oil from the hydraulic pump 11 is supplied. It is therefore possible to use the existing control valve 12 as is. Setting of the amount of pressure oil supplied from the hydraulic pump 11 to the pipe L1 is also straightforward.

-Third Embodiment-

Figure 8:
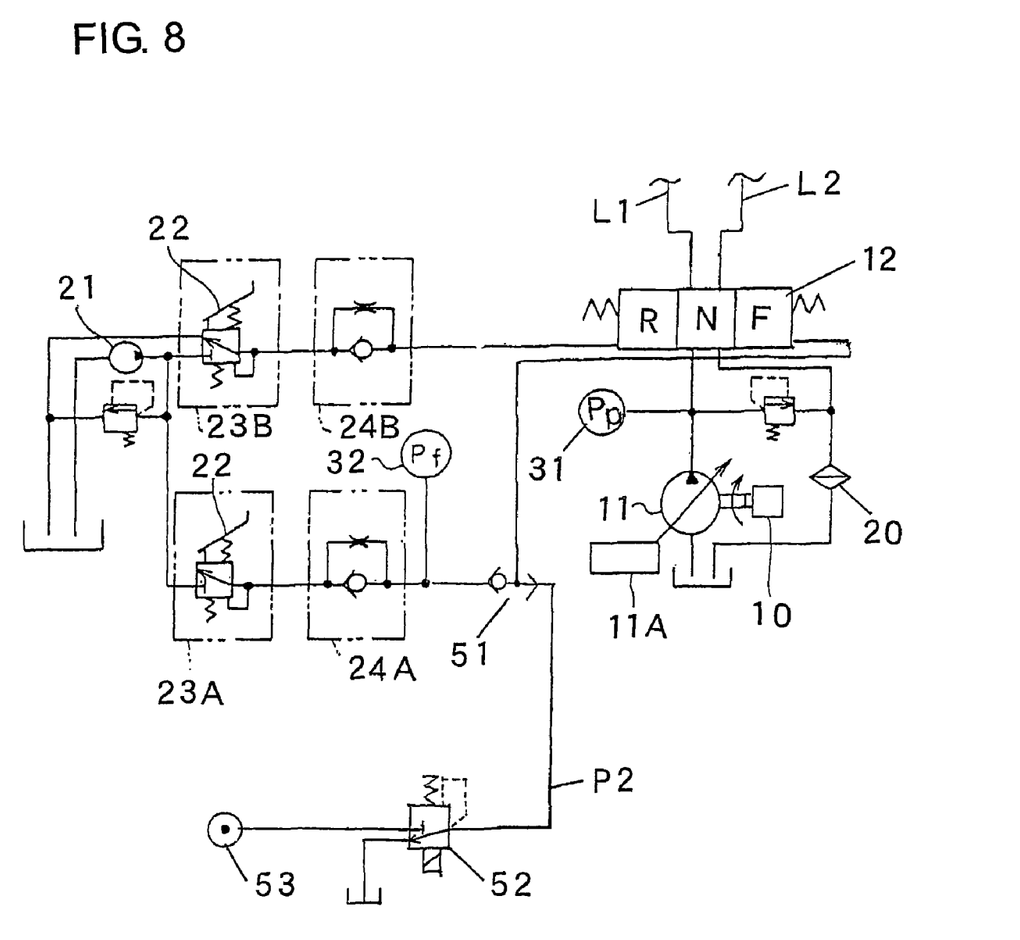
FIG. 8 is a diagram of a hydraulic circuit for a motor control device according to a third embodiment of the present invention.

A description is given of a third embodiment of a motor control device for construction machinery of the present invention with reference to FIG. 8.

In the first embodiment, the control valve 12 is switched over to the side of position F by the RAM cylinder 25 when neutral downhill travel is taking place. However, in the third embodiment, the pilot pressure acting on the control valve 12 is controlled and the control valve 12 is switched over to the side of the position F. Parts that are the same as those shown in FIGS. 1 to 6 are given the same numerals and an explanation is given in the following only of points of distinction with the first embodiment.

FIG. 8 is a diagram of a hydraulic circuit showing a configuration of the motor control device according to the third embodiment. FIG. 8 mainly shows the travel pilot circuit. As shown in FIG. 8, a shuttle valve 51 is provided between the slow return valve 24A and a pilot port of the control valve 12. A hydraulic power supply 53 is then connected to the shuttle valve 51 via the solenoid-operated proportional reduction valve 52.

The decompression rate of the solenoid-operated proportional reduction valve 52 is controlled by a control signal from the controller 30. This is to say that secondary pressure P2 is the tank pressure until the start of neutral downhill travel is detected. When the start of neutral downhill travel is detected, the secondary pressure P2 becomes a prescribed value Pa. When the end of neutral downhill travel is detected thereafter, the secondary pressure Pa is controlled so as to again become the tank pressure. Here, the prescribed value Pa corresponds to a pilot pressure that causes a stroke S1 (FIG. 4) to be generated at the spool of the control valve 12.

As a result, the secondary pressure Pa from the solenoid-operated proportional reduction valve 52 acts on the pilot port of the control valve 12 via the shuttle valve 51 when neutral downhill travel is taking place. This means that the control valve 12 is switched over to the side of the position F by just the prescribed amount, the pressure oil from the hydraulic pump 11 is guided to the pipe L1 via the control valve 12, and it is therefore possible to cool the motor circuit. At times other than when neutral downhill travel is taking place, the secondary pressure P2 is the tank pressure. The control valve 12 can then be switched over in this state according to the extent of operation of the accelerator pedal 22.

It is also possible to interpose a reduction valve between the shuttle valve 51 and the solenoid-operated proportional reduction valve 52 and then limit the secondary pressure P2 using this reduction valve. On this occasion, it is possible for the pilot pressure acting on the control valve 12 to be kept at the prescribed value Pa, which is preferable from the viewpoint of safety, even when the solenoid-operated proportional reduction valve 52 is damaged to cause the secondary pressure P2 after passing through the solenoid-operated proportional reduction valve 52 to become excessive. In this event, a solenoid-operated valve may be provided between the solenoid-operated proportional reduction valve 52 and the hydraulic power supply 53 to enable supply of pressure oil from the hydraulic power supply 53 to the electromagnetic proportional reduction valve 52 be then inhibited. It is therefore possible to make the secondary pressure P2 to be the tank pressure when the solenoid-operated proportional reduction valve 52 is damaged.

In this embodiment, neutral downhill travel is detected only when traveling forwards, with the pressure oil then being supplied from the hydraulic pump 11 to the pairs of main pipes L1 to L4 that the motor circuit. However, neutral downhill travel may be detected when traveling in reverse, with the pressure oil being supplied from the hydraulic pump 11 to the motor circuit. The control valve 12 is operated by the accelerator pedal 22 to a neutral position N that blocks the supply of driving pressure from the hydraulic pump 11 and a non-neutral position (F-position, R-position) that supplies driving pressure. However, other operation members can also be used. Braking pressure is generated at the return side pipe by the counterbalance valve 13 in a state where the control valve 12 is operated to a neutral position but other means of generating braking pressure can also be used.

The control valve 12, which is a hydraulic pilot-type control valve, is used as the control valve but it is also possible to use a mechanical control valve that switches via a link etc. as a result of the operation of the accelerator pedal 22. In this event, it is preferable for the control valve to be switched over by a prescribed amount when neutral downhill travel is taking place using the extension and retraction of a hydraulic cylinder. An electromagnetic control valve where the extent of operation of the accelerator pedal 22 is detected electrically and the control valve is switched over according to this extent of operation is preferable. It is also possible for the controller 30 to control the control valve so that the control valve is switched over by a prescribed value when neutral downhill travel is taking place even when the accelerator pedal is not operated.

The pressure oil is made to flow from the hydraulic pump 11 to the pipes L1 to L4 as a result of driving of the ram cylinder 25 due to switching of the solenoid-operated directional valve 26 (FIG. 2), the switching of the hydraulic directional valve 41 and the pilot check valve 42 due to switching of the solenoid-operated directional valve 44 (FIG. 7), or of driving of the electromagnetic proportional reduction valve 52 (FIG. 8), but the flow control unit is by no means limited thereto. The processing occurring at the controller 30 constituting the flow control unit is by no means limited to that described above. The ram cylinder 25 is used as the control valve drive unit but it is also possible to drive the control valve 12 using other control valve drive units. It is also possible for the control valve 12 to be switched over for a prescribed time or be switched over intermittently at a certain frequency rather than being switched over just by a prescribed amount. The extent of driving of the control valve 12 by the ram cylinder 25 can be mechanically limited but the limiting mechanism is by no means limited to mechanical limiting. Detection that neutral downhill travel is taking place can be carried out by the pressure sensor 31 taken as a drive pressure detection unit, the pressure sensor 32 taken as an operation detection unit, and a speed sensor 33 taken as a speed detection unit, but the detection units are by no means limited thereto.

The above embodiment is applied to the travel hydraulic motor 5 for travel use. However, the present invention can also be similarly applied to motors other than for travel use, i.e., to, for example, hydraulic motors for winch use. The present invention can similarly be applied to other construction machine than wheeled hydraulic shovels. This is to say that the present invention is not limited to the motor control device of the above-mentioned embodiments provided that the features and functions of the present invention can be implemented. The above explanation is given merely as an example, and should not be construed as in any way limiting to the corresponding relationship of items disclosed in the embodiment and items described in the scope of the patent claims in the course of interpreting the present invention.

The disclosure of the following priority application is herein incorporated by reference: Japanese Patent Application No. 2006-184517 filed on Jul. 4, 2006.

The invention claimed is:

1. A motor control device for construction machinery comprising:
 a hydraulic pump;
 a hydraulic motor driven by pressure oil from the hydraulic pump;
 a control valve that controls a flow of the pressure oil from the hydraulic pump to the hydraulic motor;
 a pair of main conduit lines that connect the hydraulic motor and the control valve on a delivery side and a return side thereof;
 an operation member that operates a spool of the control valve to either a neutral position that does not allow the pressure oil for driving from the hydraulic pump to pass through the control valve to the hydraulic motor or a non-neutral position that allows the pressure oil for driving to pass through the control valve to the hydraulic motor;
 a braking pressure generating device that generates braking pressure in the main conduit lines on the return side in a state where the spool of the control valve is positioned in the neutral position as a result of being operated by the operation member, the braking pressure opposing rotation of the hydraulic motor; and
 a flow control device for allowing the pressure oil from the hydraulic pump to flow into the pair of main conduit lines while the braking pressure is generated by the braking pressure generating device; wherein
 the flow control device comprises a control valve actuating device that actuates the spool of the control valve by a specified amount from the neutral position toward the non-neutral position regardless of operation of the operation member, and allows the pressure oil to flow from the hydraulic pump through the control valve to the pair of main conduit lines.

2. A motor control device for construction machinery according to claim 1, wherein
 the control valve actuating device has a limiting mechanism that limits an amount of actuation of the spool of the control valve from the neutral position of the control valve toward the non-neutral position of the control valve.

3. A motor control device for construction machinery according to claim 2, further comprising:
 a detection device that detects a state where downhill travel is performed by the construction machinery under a condition that braking pressure is generated by the braking pressure generating device,
 wherein the flow control device allows the pressure oil from the hydraulic pump to flow to the pair of main conduit lines when neutral downhill travel is detected by the detection device.

4. A motor control device for construction machinery according to claim 2, wherein
 the control valve actuating device is a ram cylinder that extends and retracts according to the operation of a solenoid-operated directional valve, and a maximum amount of extension of the ram cylinder corresponds to the prescribed amount for the control valve.

5. A motor control device for construction machinery according to claim 1, further comprising:
 a detection device that detects a state where downhill travel is performed by the construction machinery under a condition that braking pressure is generated by the braking pressure generating device, the state being hereinafter referred to as "neutral downhill travel",
 wherein the flow control device allows the pressure oil from the hydraulic pump to flow to the pair of main conduit lines when neutral downhill travel is detected by the detection device.

6. A motor control device for construction machinery according to claim 5, wherein
 the detection device comprises:
 a driving pressure detection device that detects driving pressure that drives the hydraulic motor;
 an operation detection device that detects an operation performed with the operation member; and
 a speed detection device that detects a traveling speed of the construction machinery, wherein
 it is determined that the neutral downhill travel is performed by the construction machinery when the driving pressure detected by the driving pressure detection device is equal to or less than a specified value, an operation with the operation member so as to put the control valve to the neutral position is detected by the operation detection device, and the traveling speed of the construction machinery detected by the speed detection device is equal to or less than a specified value.

7. A motor control device for construction machinery according to claim 6, wherein
 the control valve actuating device is a ram cylinder that extends and retracts according to the operation of a solenoid-operated directional valve, and a maximum amount of extension of the ram cylinder corresponds to the prescribed amount for the control valve.

8. A motor control device for construction machinery according to claim 5, wherein
 the control valve actuating device is a ram cylinder that extends and retracts according to the operation of a solenoid-operated directional valve, and a maximum amount of extension of the ram cylinder corresponds to the prescribed amount for the control valve.

9. A motor control device for construction machinery according to claim 1, wherein
 when the spool of the control valve is actuated by a specified amount from the neutral position towards the non-neutral position, the pressure oil delivered from the hydraulic pump to the hydraulic motor for driving thereof is limited to a quantity such that an increase in rotation speed of the hydraulic motor is prevented.

10. A motor control device for construction machinery according to claim 9, wherein
the control valve actuating device is a ram cylinder that extends and retracts according to the operation of a solenoid-operated directional valve, and a maximum amount of extension of the ram cylinder corresponds to the prescribed amount for the control valve.

11. A motor control device for construction machinery according to claim 1, wherein
the control valve actuating device is a ram cylinder that extends and retracts according to the operation of a solenoid-operated directional valve, and a maximum amount of extension of the ram cylinder corresponds to the prescribed amount for the control valve.

12. A motor control device for construction machinery according to claim 1, wherein
the flow control device has a directional valve, and the pressure oil from the hydraulic pump is guided to the pair of main conduit lines via the directional valve without passing via the control valve.

13. A motor control device for construction machinery according to claim 1, wherein
the hydraulic motor is a hydraulic motor for traveling use.

14. Construction machinery comprising the motor control device for construction machinery according to claim 1.

15. Construction machinery according to claim 14, wherein
the construction machinery is construction machinery that travels on wheels.

* * * * *